(12) United States Patent
Sasaki et al.

(10) Patent No.: US 8,120,834 B2
(45) Date of Patent: Feb. 21, 2012

(54) OPTICAL PROPERTY ALTERING APPARATUS

(75) Inventors: Shunsuke Sasaki, Saitama (JP); Kazuki Nishizawa, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 12/714,870

(22) Filed: Mar. 1, 2010

(65) Prior Publication Data

US 2010/0226000 A1 Sep. 9, 2010

(30) Foreign Application Priority Data

Mar. 4, 2009 (JP) .................................. 2009-050576

(51) Int. Cl.
*G02F 1/03* (2006.01)
*G02F 1/09* (2006.01)

(52) U.S. Cl. ........................................ 359/245; 359/280

(58) Field of Classification Search ................... 359/245, 359/246, 254, 255, 280, 281, 283
See application file for complete search history.

(56) References Cited

U.S. PATENT DOCUMENTS

| | | | |
|---|---|---|---|
| 7,015,865 B2 | 3/2006 | Isaacs et al. | |
| 7,463,397 B2 * | 12/2008 | Arnone et al. | ................ 359/245 |
| 2006/0238897 A1 | 10/2006 | Nishioka | |
| 2007/0195433 A1 | 8/2007 | Nishioka | |
| 2007/0201149 A1 | 8/2007 | Nishioka | |

FOREIGN PATENT DOCUMENTS

| | | |
|---|---|---|
| JP | 2005-260965 (A) | 9/2005 |
| JP | 2006-301345 (A) | 11/2006 |
| JP | 2007-226033 (A) | 9/2007 |
| JP | 2007-256929 (A) | 10/2007 |

OTHER PUBLICATIONS

Linden, et al. Photonic Metamaterials: Magnetism at Optical Frequencies, IEEE Journal of Selected Topics in Quantum Electronics, vol. 12, No. 6, Nov./Dec. 2006, pp. 1097-1105.*

Takuo Tanaka, Design of Plasmonic Metamaterials in the Visible Light Region, Optical Society of Japan, Journal "Kogaku", 2007, pp. 584-589, vol. 6, No. 10.

* cited by examiner

*Primary Examiner* — William Choi
(74) *Attorney, Agent, or Firm* — Foley & Lardner LLP

(57) ABSTRACT

An optical property altering apparatus includes an optical property altering element formed by inductors that are smaller than a wavelength of visible light, mutually connected by connecting lines, and arranged in a single plane; a photoconductor that is excited by incident light and generates alternating current of a frequency identical to that of the incident light; and an amplifying circuit that amplifies the alternating current generated by the photoconductor and supplies the amplified alternating current to the optical property altering element, where the optical property altering element, through supply of the alternating current from the amplifying circuit, arbitrarily alters its refractive index.

17 Claims, 4 Drawing Sheets

EFFECTIVE DIAMETER

OPTICAL PROPERTY ALTERING APPARATUS

CROSS-REFERENCE TO RELATED APPLICATIONS

The present document incorporates by reference the entire contents of Japanese priority document, 2009-050576 filed in Japan on Mar. 4, 2009.

BACKGROUND OF THE INVENTION

1. Field of the Invention

The present invention relates to an optical property altering apparatus.

2. Description of the Related Art

In general, imaging apparatuses, such as compact digital cameras and monitoring cameras are among devices employing small lenses include. In such imaging apparatuses, a given lens in the optical system is moved along the optical axis, or if digital processing is possible, captured image data is digitally processed and image expansion/reduction processing is executed. Image focusing is typically performed by the movement of a focusing lens. Further, aberration occurs in a lens as a consequence of refractive index differences related to optical wavelength. Thus in an effort to eliminate aberration, the curved surface of a given lens in the optical system is formed to into an aspheric surface derived from a polynomial expression.

However, for zoom and focus functions provided in conventional imaging apparatuses, a lens is mechanically moved and thus, as a result of mechanical instability, optical axis deviation, optical axis, tilt, lens tilt, etc. occur and consequently, is linked to deterioration of the image quality. Furthermore, there is a problem of differences among elements as a cumulative result of manufacture tolerances. On the other hand, problems arise even if an aspheric lens is employed. For example, if the aspheric lens is fabricated by a glass mold, high precision fabrication technology is required. Further, if an aspheric surface is created by a compound lens, an aspheric shape must be formed on a glass lens using, for example, a UV curable resin, inviting additional fabrication steps.

On the other hand, telescopes provided at observatories and the like are devices that employ large lenses. The Subaru Telescope at an observatory in Hawaii is a classic example. This telescope is a large reflecting telescope, whose most important element, the primary mirror, is said to have a 14 nm planar grind tolerance, extremely high planar precision. Furthermore, the primary mirror is fabricated to be thin for weight reduction and from a back side, is supported by 261 actuators to sequentially correct distortion of the primary mirror resulting from orientation. With respect to atmospheric distortion, a prism having a structure substantially identical to that of the primary mirror is inserted into the optical path and the prism is deformed in such a way to negate the distortion and facilitate the sequential correction.

However, with such telescopes achieving high resolution by a single primary mirror, the primary mirror must have extremely high planar precision and thus, an apparatus that corrects distortion of such a primary mirror must be uniquely fabricated according to the properties of the primary mirror, making versatility extremely low. If atmospheric distortion is corrected by a technique similar to that for correcting distortion of the primary mirror, additional optical elements such as a prism for correction become necessary and, luminance and saturation of that amount alone decrease. Further, if the number of optical elements increases, the rate of failure increases.

To solve such problems, the development of "plasmonic metamaterials" (metamaterials) is in progress. A metamaterial is an element that achieves optical property improvement and has an optical property that does not conventionally exist. For example, Tanaka, Takuo, et al in "Design of Plasmonic Metamaterials in the Visible Light Region", Optical Society of Japan, Kogaku Journal, Vol. 6, No. 10, 2007, pp. 584-589, discloses an attempt to create an element having a negative refractive index by creating a fine structure on a surface of an optical element and by using the dielectric constant of the material used for the structure and unique permeability obtained from the arrangement of the structure. Further, Japanese Patent Application Laid-Open Publication Nos. 2007-226033, 2007-256929, 2006-301345, and 2005-260965, for example, propose technology that improves optical properties using a metamaterial.

To solve the above problem associated with the small lens, demand exists for a means to change the focal length of an optical system without the movement of an optical element. Further, demand exists for provision of a function that by an optical element obtains an effect equivalent to an aspheric lens.

However, the technologies disclosed in the above patent documents fail to solve the problems associated with the above conventional technologies. That is, the technologies disclosed in Japanese Patent Application Laid-Open Publication Nos. 2007-226033, 2007-256929, and 2006-301345 respectively involve setting, in advance, the refractive index to become a given value (negative refractive index) to design and fabricate an element, making the refractive index unchangeable after fabrication. Hence, variation of the focal length of an optical system is impossible without moving an optical element. Further, since a uniform refractive index distribution is imparted for an optical element, for example, it cannot be said that an effect equivalent to an aspheric lens will be achieved by making the refractive index distribution non-uniform.

Further, the technology disclosed in Japanese Patent Application Laid-Open Publication No. 2005-260965 is able to vary the refractive index. However, this technology is limited to use in a radio wave area and merely switches between a common property and a property as that of a metameterial and hence, the above problems associated with a small lens are not solved.

On the other hand, to solve the above problems associated with a large lens, it is preferable for optical system distortion and atmospheric distortion to be addressed using an optical element facilitating versatility.

However, the technologies disclosed in the above patent documents fail to solve the problems associated with the conventional technologies. That is, the technologies disclosed in Japanese Patent Application Laid-Open Publication Nos. 2007-226033, 2007-256929, and 2006-301345 respectively involve setting, in advance, the refractive index to become a given value (negative refractive index) to design and fabricate an element, making the refractive index unchangeable after fabrication. Hence, the refractive index cannot be changed in real-time and thus, in particular, distortion resulting from a difference in orientation cannot be corrected as circumstances dictate. Further, since the refractive index cannot be changed in real-time, atmospheric distortion cannot be corrected.

The technology disclosed in Japanese Patent Application Laid-Open Publication No. 2005-260965 can vary the refractive index. However, this technology is limited to use in a radio wave area and merely switches between a common property and a property as that of a metameterial and hence, cannot correct optical element distortion and atmospheric distortion.

SUMMARY OF THE INVENTION

It is an object of the present invention to at least solve the above problems in the conventional technologies.

An optical property altering apparatus according to one aspect of the present invention includes an optical property altering element formed by inductors that are smaller than a wavelength of visible light, mutually connected by connecting lines, and arranged in a single plane; a photoconductor that is excited by incident light and generates alternating current of a frequency identical to that of the incident light; and an amplifying circuit that amplifies the alternating current generated by the photoconductor and supplies the amplified alternating current to the optical property altering element, where the optical property altering element, through supply of the alternating current from the amplifying circuit, arbitrarily alters its refractive index.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

An optical property altering apparatus according to the present invention includes an optical property altering element that is formed using a metamaterial that artificially produces a negative refractive index. First, a mechanism of the metamaterial will be described.

Figure 1:
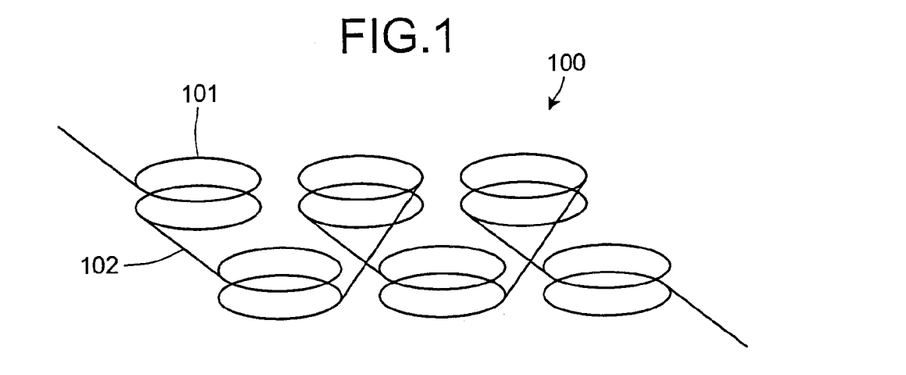
FIG. 1 is a schematic depicting a fundamental structure of the metamaterial.

FIG. 1 is a schematic depicting a fundamental structure of the metamaterial. As depicted in FIG. 1, a metamaterial 100 is formed by magnetic field generating coils (nanocoils) 101 (inductors) that are smaller than a wavelength of visible light, connected by connecting lines 102, and arranged in plural in a single plane. This is a fundamental structure of the metamaterial. The magnetic field generating coils 101 may be formed in any number of layers. The metamaterial 100 generates a demagnetizing field with respect to light, i.e., is a material having a negative refractive index.

$$N = (\in \mu)^{1/2}$$

Where, N is the refractive index, $\in$ is the dielectric constant of the material, and $\mu$ is permeability.

Conventionally, a material of $\mu<0$ has not commonly existed. For example, glass which is widely used in the formation of optical elements has values of $\in>0$, $\mu>0$, and $N>0$. Further, for materials having $\in<0$, such as silver, N is an imaginary number. This demonstrates that electromagnetic waves including light cannot be transmitted.

Here, if the magnetic field generating coils 101, which are made of silver and are smaller than a wavelength of light, are arranged on a glass surface, the magnetic field generating coils 101 generate a magnetic field by the magnetic field accompanying light (and the resonance vibration of free electrons on the surface of the silver). The generated magnetic field moves in a direction contrary to and is larger than the magnetic field accompanying light; the apparent permeability at the glass surface is $\mu<0$. Further, for silver, the material from which the magnetic field generating coils 101 are made, $\in<0$ and hence, the apparent dielectric constant at the glass surface is $\in<0$. Thus, a material (metamaterial) having $N<0$ is created.

Since the value of permeability $\mu$ changes according to the magnitude of the current in the magnetic field generating coils 101, if a current can be forced through the magnetic field generating coil 101 externally, the value of N can also be varied. According to a trial calculation of the Independent Administrative Institution Rikagaku Kenkyujo (RIKEN), to change the permeability g, the current for one of the magnetic field generating coils 101, assuming 3 [V] is applied to the magnetic field generating coil 101, is $1.6 \times 10^{-12}$ [A]. Thus, if the magnetic field generating coil 101 is arranged in a single layer on a $\phi 20$ optical element, overall a current of approximately $2.6 \times 10^{-4}$ [A] is required.

Here, for example, the metamaterial 100 is assumed to be uniformly distributed on a lens of $\phi 20$, having radii of curvature of a first and a second surface respectively 100 mm, and a surface separation of 2 mm. The shape of the magnetic field generating coil 101 is the shape and quality proposed by RIKEN.

Assuming that the frequency of light incident to the element is 700 THz, according to the Drude Model, the dielectric constant $\in$ of the magnetic field generating coil 101 is:

$$\varepsilon = ((\omega p)^{1/2})/((\omega)^{1/2})$$
$$= (1.4 \times 10^{16})^{1/2} / (7 \times 10^{14})^{1/2}$$
$$= -3.99 \times 10^{-2}$$

Where, $\omega p$ is plasma frequency and $\omega$ is angular frequency. Further, the value of $\omega p$ is referenced from p. 585 of the publication by Tanaka, Takuo, et al cited above.

If current is not applied particularly to the magnetic field generating coils 101, according to the publication by Tanaka, Takuo, et al cited above, the permeability $\mu$ of the element is −1 and thus, the refractive index N of the element is:

$$N = (\in \mu)^{1/2} \approx 20$$

Where, the focal length of the element is 0.27 mm.

Here, for example, with excitation caused by the incidence of light, if with respect to current flowing through the magnetic field generating coil 101, a current of $6.4 \times 10^{-12}$ [A]

flows in a successive direction, permeability μ becomes approximately −2 and the focal length of the element becomes 0.19 mm. On the other hand, if a current of 1.2×10⁻12 [A] flows in the reverse direction, permeability μ becomes approximately −0.5 and the focal length of the element becomes 0.41 mm, i.e., the refractive index can be varied according to the magnitude and direction of the current supplied to the element.

The present invention includes an optical element (optical property altering element) that using the metamaterial 100, alters its refractive index, where current is applied to the optical property altering element and by a change in the magnitude of the current or direction, etc., the refractive index of the optical property altering element is altered. By this configuration, a zoom lens function can be implemented without moving the optical property altering element. Further, the optical property altering element is formed by independent units of the metamaterial 100 and by supplying currents of different magnitudes to each unit of metamaterial 100, the refractive index distribution in the optical property altering element can be made non-uniform, and thereby, an effect equivalent to an aspheric lens is achieved.

The following 4 elements contribute to the implementation of the present invention.

(1) Arrangement of a photoconductor (photoconductor coil) that induces resonance optically and generates an alternating current.

(2) Arrangement of an amplifying unit (amplifying circuit) that amplifies the alternating current.

(3) Arrangement of a means (metamaterial) to generate a demagnetizing field with respect to light.

(4) Connection of the 3 elements above.

Exemplary embodiments of optical property altering apparatus according to the present invention are explained in detail below.

Figure 2:
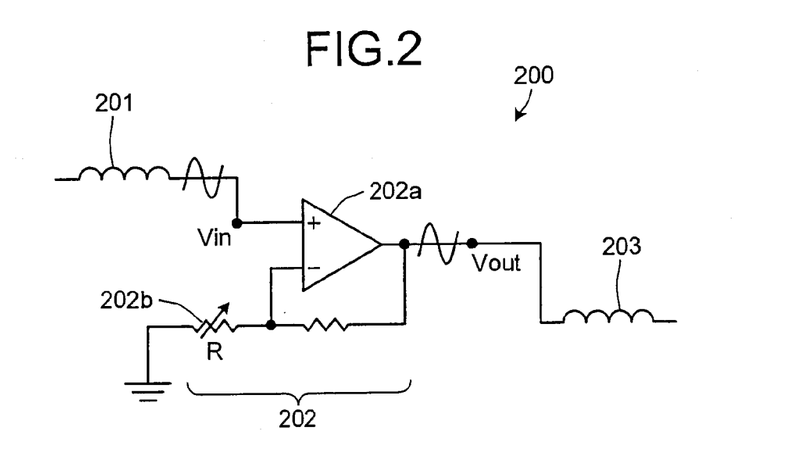
FIG. 2 is a diagram of a configuration of an optical property altering apparatus according to a first embodiment.

FIG. 2 is a diagram of a configuration of the optical property altering apparatus according to a first embodiment. This optical property altering apparatus 200 includes a photoconductor 201, an amplifying circuit 202, and an optical property altering element 203.

The photoconductor 201 is formed by a photoconductor coil that similar to the magnetic field generating coil 101 depicted in FIG. 1, is smaller than a wavelength of visible light. The photoconductor 201 is excited by the incidence of light and generates an alternating current of a frequency identical to that of the incident light.

The amplifying circuit 202 amplifies the alternating current generated by the photoconductor 201 and supplies the amplified alternating current to the optical property altering element 203. The amplifying circuit 202 includes an operational amplifier 202a and a variable resistor 202b. By varying the resistance of the variable resistor 202b, the magnitude of the alternating current supplied to the optical property altering element 203 can be varied. The resistance of the variable resistor 202b is variable external to the optical property altering apparatus 200. Although an example of current amplification by the operational amplifier 202a is given, current amplification may be performed by another means.

The optical property altering element 203 is formed using the metamaterial 100 depicted in FIG. 1, i.e., is formed by the magnetic field generating coils 101, which are smaller than a wavelength of visible light, connected by connecting lines 102, and arranged in plural in a single plane. The optical property altering element 203 is fabricated using nanotechnology such as photolithography. Further, in general, the optical property altering element 203 is used arranged on a surface (of an optical element) through which light is transmitted.

In the optical property altering apparatus 200, the photoconductor 201, by receiving light, generates an alternating current of a frequency equivalent to that of the light received; the amplifying circuit 202 amplifies the alternating current generated by the photoconductor 201 and supplies the amplified alternating current to the optical property altering element 203; and consequently, the optical property altering element 203 can alter its refractive index for light having a frequency equivalent to that of the alternating current supplied thereto (i.e., light identical to the light received by the photoconductor 201).

In the optical property altering apparatus 200, the resistance of the variable resistor 202b in the amplifying circuit 202 can be arbitrarily varied. Consequently, the magnitude of the current supplied to the optical property altering element 203 is varied and thus, its refractive index for light transmitted through the optical property altering element 203 can be arbitrarily altered. Further, since the photoconductor 201 can generate alternating current, the direction of the current supplied to the optical property altering element 203 can also be changed. Hence, by changing the direction of current supplied to the optical property altering element 203, its refractive index for light transmitted through the optical property altering element 203 can be altered.

Even if the direction of the magnetic field of the magnetic field generating coil 101 forming the optical property altering element 203 and that of photoconductor coil forming the photoconductor 201 are inversed, the magnitude of current supplied to the magnetic field generating coil 101 is amplified by the amplifying circuit 202 and thus, as the magnetic field of the photoconductor coil is cancelled, no trouble occurs.

As described, in the optical property altering apparatus 200, through the incidence of light to the apparatus, current is generated and the refractive index is altered. Hence, to efficiently convert the refractive index, it is preferable for the conditions of the light incident to the photoconductor 201 and to the optical property altering element 203 to be identical. Therefore, preferably the photoconductor 201, the amplifying circuit 202, and the optical property altering element 203 are arranged in close proximity to one another.

Figure 3:
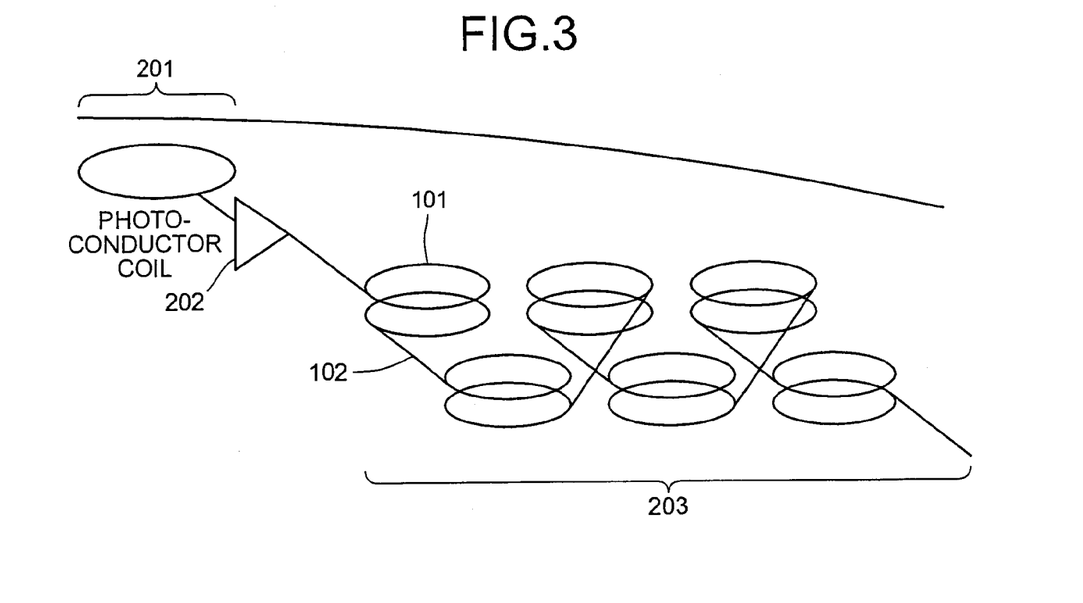
FIG. 3 is a diagram of an arrangement example of a photoconductor, an amplifying circuit, and the optical property altering element.

FIG. 3 is a diagram of an arrangement example of the photoconductor 201, the amplifying circuit 202, and the optical property altering element 203. As depicted in FIG. 3, the photoconductor coil forming the photoconductor 201, the amplifying circuit 202, and the magnetic field generating coils 101 forming the optical property altering element 203 are arranged in close proximity to one another, preferably. In this case, it is preferable for the photoconductor 201, the amplifying circuit 202, and the optical property altering element 203 to be arranged on a surface (of an optical element) through which light is transmitted. Concerning the relative positions of the photoconductor 201 and the optical property altering element 203, the photoconductor 201 may be arranged outside an effective diameter of the optical property altering element 203 or within the effective diameter of the optical property altering element 203.

Figure 4:
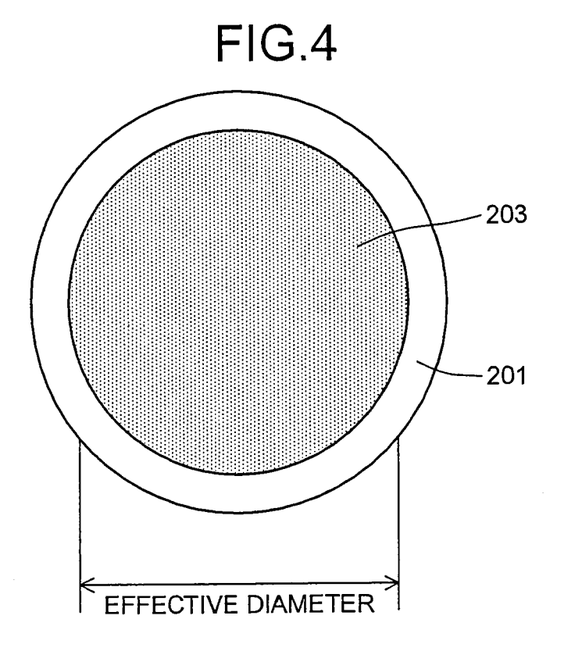
FIG. 4 is a diagram of an arrangement example of the photoconductor and the optical property altering element.

FIG. 4 is a diagram of an arrangement example of the photoconductor 201 and the optical property altering element 203. FIG. 4 depicts an example in which the photoconductor 201 is arranged in a band-like shape outside the effective diameter of the optical property altering element 203 that is formed into a circular shape. Through such an arrangement, the conditions of the light incident to the photoconductor 201 and the optical property altering element 203 become identical.

As described, according to the first embodiment, the refractive index of the optical property altering element 203 can be arbitrarily altered. Here, if alternating current uniformly flows through all of the magnetic field generating coils 101 forming the optical property altering element 203, the refractive index distribution in the optical property altering element 203 becomes uniform. Further, if the magnitude of the current flowing through all of the magnetic field generating coils 101 is uniform, the refractive index uniformly changes and thus, the focal length can be varied. That is, the optical property altering apparatus 200 of the optical property altering element 203 can implement the function of conventional zoom and focus mechanisms. Consequently, driving units for zoom mechanisms, focus mechanisms, etc. equipped in conventional imaging apparatuses become unnecessary, facilitating a simpler configuration and reductions in noise, vibration, and weight.

Further, since electrical signals directly become zoom and focus control signals without passing through a driving mechanism, trouble such as response delay, overshooting, etc. can be resolved. If a filter that transmits only light of a given wavelength is provided ahead of (on a side where light is incident to) the photoconductor 201, refractive index control specific to light of the given wavelength is enabled.

The optical property altering element 203 may be arranged on a surface of an optical element having a planar shape or on a surface of a lens. In the case of arrangement on a surface of a lens, the inherent refractive index of the lens is regarded as a reference and by causing the refractive index to change by the optical property altering element 203, application to a wide variety of uses is possible. Further, by selecting material of $\in$<0 or a material of $\in$>0 and fabricating the magnetic field generating coil 101, further application to various uses becomes possible.

On the other hand, by configuring the optical property altering element 203 such that alternating current flows through only a portion of the magnetic field generating coils 101 forming the optical property altering element 203, the refractive distribution in the optical property altering element 203 becomes non-uniform, i.e., only the refractive index of a portion of the optical property altering element 203 is controlled. Consequently, an effect equivalent to an aspheric lens is achieved.

To achieve an effect equivalent to an aspheric lens, the metamaterial 100 forming the optical property altering element 203 may be characteristically arranged such that different refractive indexes are generated in the element.

Figure 5:
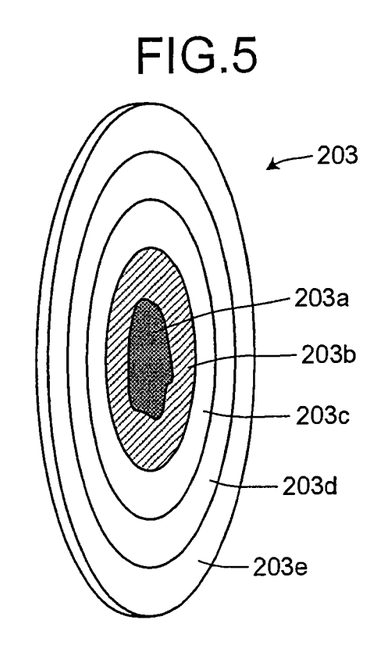
FIG. 5 is a diagram of another example of a configuration of the optical property altering element.

FIG. 5 is a diagram of another example of configuration for the optical property altering element 203. In this example, on a surface (of an optical element) through which light is transmitted (not depicted), independent units of the metamaterial 100 are formed in circular bands having an identical center (circular bands 203a, 203b, 203c, 203d, and 203e) to form the optical property altering element 203. The circular bands 203a, 203b, 203c, 203d, and 203e are supplied alternating currents from mutually independent amplifying circuits (not depicted), respectively. By varying the resistance of variable resistors incidental to the independent the amplifying circuits, currents of differing magnitudes can be respectively supplied to the circular bands 203a, 203b, 203c, 203d, and 203e, thereby enabling the refractive indices of the circular bands 203a, 203b, 203c, 203d, and 203e, respectively, to be set to differ thereamong and to achieve an effect equivalent to an aspheric lens.

In FIG. 5, an example is depicted in which a function equivalent to that of an aspheric lens is achieved by the optical property altering element 203. However, another configuration may be employed. For example, the optical property altering element 203 may be formed in plural layers along the direction of the optical axis.

Figure 6:
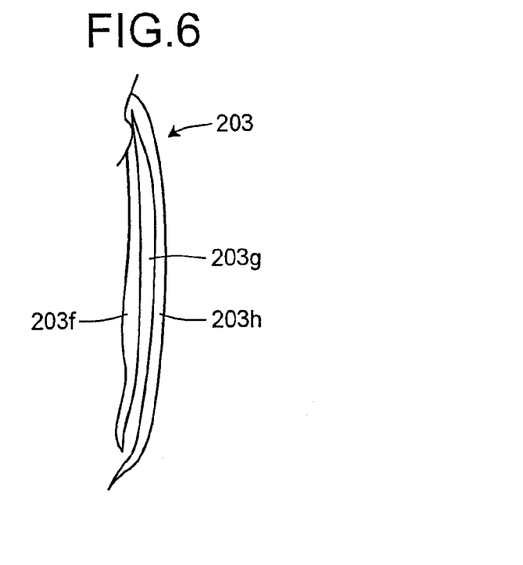
FIG. 6 is a diagram of an example of a configuration of the optical property altering element formed by plural layers.

FIG. 6 is a diagram of an example of a configuration of the optical property altering element 203 formed by plural layers. In this example, sequentially, a first layer 203f, a second layer 203g and a third layer 203h are overlapped to form the optical property altering element 203. The first layer 203f, the second layer 203g, and the third layer 203h are formed by independent units of metamaterial 100, respectively. The first layer 203f, the second layer 203g, and the third layer 203h are supplied alternating currents from independent amplifying circuits (not depicted), respectively. By varying the resistance of variable resistors incidental to the independent amplifying circuits, currents of differing magnitudes can be supplied to the first layer 203f, the second layer 203g, and the third layer 203h, thereby enabling the refractive indices of the first layer 203f, the second layer 203g, and the third layer 203h, respectively, to be set to differ thereamong and cause the refractive index distribution in the optical property altering element 203 to become non-uniform and thus, achieve an effect equivalent to an aspheric lens.

As described, by forming the optical property altering element 203 in mutually independent circular bands or layers, refractive index distribution can be made uniform or non-uniform by a single unit of the optical property altering element 203. Hence, it becomes possible to implement a function of a spherical lens and an aspheric lens by a single unit of the optical property altering element 203. By equipping the optical property altering apparatus 200 having such characteristics in an imaging apparatus, an aspheric lens becomes unnecessary, thereby making fabrication and inspection of an aspheric lens unnecessary and simplifying the manufacturing process of the imaging apparatus.

When the optical property altering apparatus 200 according to the first embodiment is used, if the optical refractive index distributions for zoom position and focus position are known, the refractive index of each of the circular bands or layers forming the optical property altering element 203 can be altered according to the zoom position or focus position to consistently achieve ideal optical performance. In other words, by altering the refractive index of the circular bands or layers according to zoom or focus position, a lens that consistently achieves optimal refractive index distribution by dynamic variation can be provided.

Although description has been given presuming primarily the handling of light of wavelengths in the visible spectrum, if the quality of the magnetic field generating coils 101 and, the frequency and phase of the alternating current thereto are changed, theoretically, with any magnetic field, the refractive index can be altered.

According to the first embodiment, an example of an optical property altering apparatus primarily direct to small imaging apparatuses has been described. A second embodiment describes an optical property altering apparatus suitable for large optical systems like astronomical telescopes at observatories.

Figure 7:
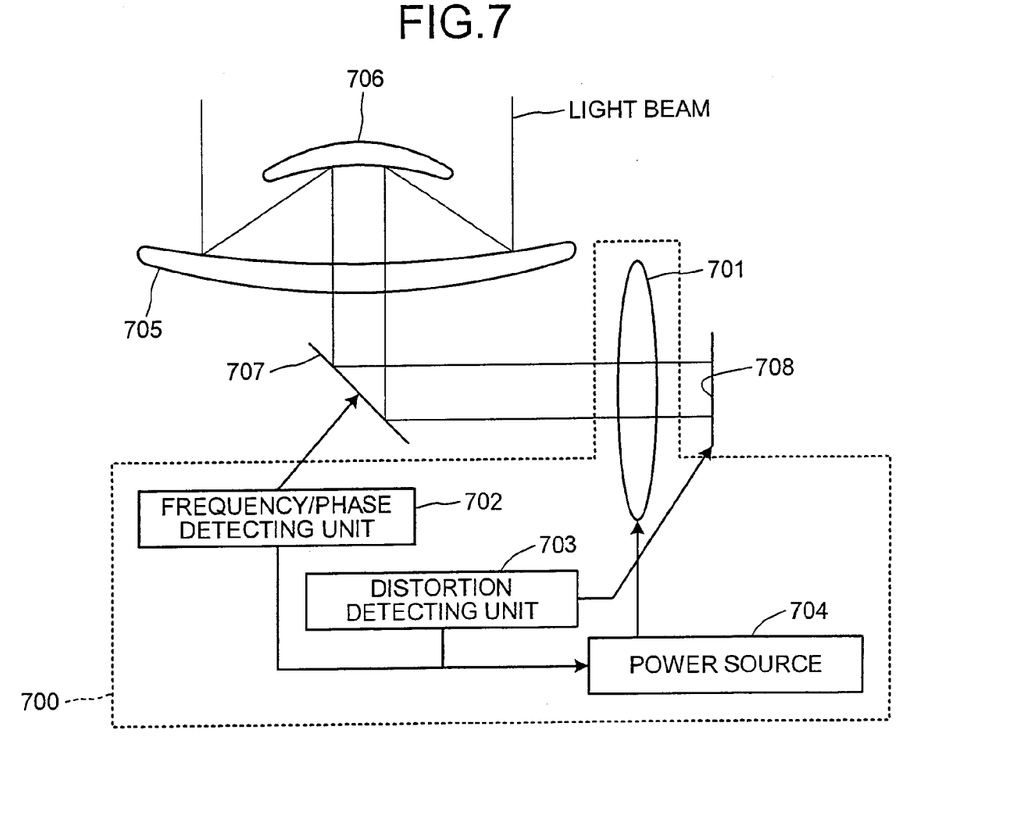
FIG. 7 is a diagram of a configuration of an optical property altering apparatus according to a second embodiment.

FIG. 7 is a diagram of a configuration of an optical property altering apparatus according to the second embodiment. FIG. 7 depicts installation in a large telescope. An optical property altering apparatus 700 includes an optical property altering element 701, a frequency/phase detecting unit 702, a distortion detecting unit 703 and a power source 704.

The optical property altering element 701 is formed using the metamaterial 100 depicted in FIG. 1, i.e., is formed by the magnetic field generating coils 101, which are smaller than a wavelength of visible light, connected by connecting lines 102, and arranged in plural in a single plane. The optical property altering element 701 is fabricated using nanotechnology such as photolithography. Further, the optical property altering element 701 is arranged on a surface of an optical element of an astronomical telescope. The optical property altering element 701 alters its refractive index for light having the same frequency/phase as the alternating current supplied thereto. The frequency/phase detecting unit 702 detects the frequency and the phase of a light beam from a collimating mirror 706 collimating light incident to a primary mirror. FIG. 7 depicts an example in which the frequency/phase detecting unit 702 detects the frequency and the phase of a light beam at a mirror 707 that changes the optical path of the light beam from the collimating mirror 706. The distortion detecting unit 703 detects image distortion caused by optical element distortion at an imaging plane 708 or caused by atmospheric distortion. The power source 704 supplies alternating current to the optical property altering element 701. The power source 704 is capable of generating alternating currents of a frequency up to a THz level. The reasoning for this is that for observation using astronomical telescopes, observation is not limited to visible light and for example, high frequency radiation may be observed. Hence, to alter the refractive index of a high frequency light beam, high frequency current is necessary.

In the example depicted in FIG. 7, if the refractive index is to be altered for light having the frequency and the phase detected by the frequency/phase detecting unit 702, for example, the power source 704 may supply to the optical property altering element 701, alternating current of the frequency and the phase detected by the frequency/phase detecting unit 702, thereby enabling refractive index control specific to light of a given frequency/phase.

In astronomical telescopes, image distortion occurs as a consequence of distortion of internal optical elements (especially the primary mirror 705) and atmospheric distortion. Hence, if the distortion detecting unit 703 detects image distortion at the imaging plane 708, the frequency/phase detecting unit 702 detects the frequency and the phase of the light causing the distortion, and the power source 704 supplies to the optical property altering element 701, alternating current of the frequency and the phase detected by the frequency/phase detecting unit 702 to thereby alter the refractive index for light having the frequency and the phase causing the image distortion and thus, correct the image distortion.

Similar to the first embodiment, in the second embodiment, if configuration is such that only a portion of the magnetic field generating coils 101 forming the optical property altering element 701 are supplied alternating current, the refractive index distribution in the optical property altering element 701 becomes non-uniform, i.e., only the refractive index of a portion of the optical property altering element 701 is controlled. Consequently, an effect equivalent to an aspheric lens is achieved and more precise correction of image distortion can be implemented.

On the other hand, for astronomical telescopes installed at observatories, since faint light must be detected, highly precise image formation is required. Hence, highly precise refractive index control is required of the optical property altering element 701 and thus, it is preferable for finer settings of the refractive index to be possible at the optical property altering element 701.

Figure 8:
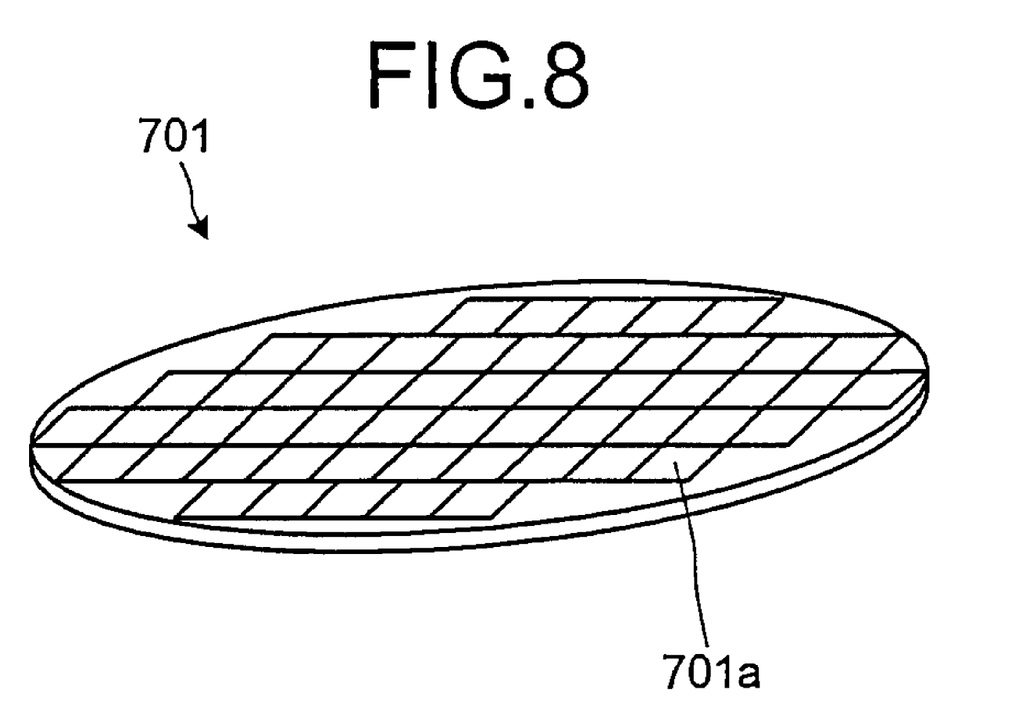
FIG. 8 is a diagram of an example of a configuration of the optical property altering element.

FIG. 8 is a diagram of an example of a configuration of the optical property altering element 701. The optical property altering element 701 is formed by arranging plural independent grids 701*a* on a surface (of an optical element) through which light is transmitted. Each grid 701*a* is formed of the metamaterial 100 depicted in FIG. 1. Further, alternating current differing in magnitude, frequency, etc. is supplied to the grids 701*a*, respectively from the power source 704. Thus, the refractive index can be set for each grid 701*a*. And, at the same time, refractive index control specific to light of a given frequency can be executed for the grids 701*a*, respectively. If refractive index control is executed for light transmitted through the grids 701*a* overall, light in the visible light region to the ultraviolet/infrared region can be handled. Further, refractive index control may be executed for only a portion of the grids 701*a*. Although in FIG. 8, grids 701*a* are depicted to have a square shape, the shape of the grids 701*a* is not limited hereto and may be, for example, a pentagonal or hexagonal shape. The grids 701*a* on a planar surface may be arranged at a distance less than the wavelength of the light transmitted therethrough. Further, the grids 701*a* may be formed in plural layers, in which case, adjacent layers may be independent of one another. Thus, finer refractive index control can be executed.

As described, according to the optical property altering apparatus 700 of the second embodiment, the grids 701*a* forming the optical property altering element 701 are independent and control the refractive index. Therefore, image distortion caused by distortion of large optical elements in a telescope or caused by atmospheric distortion can be simultaneously corrected. Further, correction of distortion specific to light of a specific frequency is possible. Additionally, distortion correction can be executed without moving the optical property altering element 70, thereby preventing deviation of the optical axis as a result of moving the optical property altering element 701. Since a unit for moving the optical property altering element 701 becomes unnecessary, the size of the apparatus can be reduced. The grids 701*a* forming the optical property altering element 701 are independent and control the refractive index and thus, the optical property altering element 701 has a function equivalent to that of an aspheric lens and consequently, it is not necessary to impart complicated curvatures to the shape of the optical property altering element 701.

The optical property altering element 701 may be arranged on a surface of an optical element having a planar shape or on a surface of a lens. Here, if the optical property altering apparatus 700 according to the second embodiment is applied to a telescope, it is preferable for the optical property altering element 701 to be arranged on an optical element other than the one of the largest diameter and if possible, to be arranged on the optical element having the smallest diameter. Thus, the optical property altering apparatus 700 can be easily installed in a telescope, i.e., unlike conventional technology where an image distortion correcting unit is provided for a large element whose shape differs according to telescope, the optical property altering element 701 is applicable as a universal optical element and thus, irrespective of the type of telescope, can be easily adopted and by merely providing the optical property altering element 701 at an existing telescope facility, distortion correction can be implemented. Although the example depicted in FIG. 7 is an example of application of the optical property altering apparatus 700 to a reflecting telescope, the optical property altering apparatus 700 is additionally applicable to refracting telescopes.

If the optical property altering apparatus 700 is applied to a telescope, since distortion correction is executed by the optical property altering element 701, high precision processing of large diameter optical elements such as the primary mirror 705 becomes unnecessary. For example, if configuration is such that a rib is provided, whereby a large optical element is thin overall with only a designated portion being relatively thick, a large amount of distortion would be expected near the rib. However, in this case, since the pattern of distortion can be predicted in advance, based on information concerning the predicted pattern of distortion, refractive index control of the optical property altering element 701 is executed and thus, image distortion can be easily corrected.

Similar to the first embodiment, according to the optical property altering apparatus 700 of the second embodiment, if the quality of the magnetic field generating coils 101 and, the frequency and the phase of the alternating current supplied thereto are changed, theoretically, with any magnetic field, the refractive index can be altered.

Although in the second embodiment, an example is given of the optical property altering element 701 being applied to a telescope having large optical elements, the optical property altering element 701 is additionally applicable to small imaging apparatuses, such as digital cameras, single lens reflex camera, monitoring cameras, and mobile phone cameras, having small optical elements. Application of the optical property altering element 701 to small imaging apparatuses enables more complex refractive index control and images of high resolution.

As described, according to the optical property altering apparatus of the present invention, the refractive index of an optical element can be arbitrarily altered. Consequently, without moving an optical element, the focal length of the optical system can be varied enabling magnification. Furthermore, since the optical property altering apparatus can make the refractive index distribution non-uniform, the optical element can be imparted with a function equivalent to that of an aspheric lens.

According to the present invention, by merely supplying the optical property altering element with alternating current, the function of an aspheric lens can be implemented and thus, by ON/OFF control of the alternating current supplied to the optical property altering element, functions of a spherical lens and an aspheric lens can be implemented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical property altering apparatus comprising:
    an optical property altering element formed by a plurality of inductors that are smaller than a wavelength of visible light, mutually connected by connecting lines, and arranged in a single plane;
    a photoconductor that is excitable by incident light and configured to generate alternating current of a frequency identical to that of the incident light; and
    an amplifying circuit that is configured to amplify the alternating current generated by the photoconductor and supply the amplified alternating current to the optical property altering element.

2. The optical property altering apparatus according to claim 1, wherein the optical property altering element is configured to have a focal length that is variable based on changes in a magnitude of the alternating current when the alternating current is supplied uniformly to the plurality of inductors.

3. The optical property altering apparatus according to claim 1, wherein the optical property altering element is configured to function as an aspheric lens when the alternating current is supplied to only a portion of the plurality of inductors.

4. The optical property altering apparatus according to claim 1, wherein:
    the optical property altering element is formed as a plurality of concentric circular bands, and
    the optical property altering element is configured to function as an aspheric lens when the alternating current supplied to each of the circular bands differs in magnitude and a refractive index distribution in the optical property altering element becomes non-uniform.

5. The optical property altering apparatus according to claim 1, wherein:
    the optical property altering element is formed as a plurality of layers, and
    the optical property altering element is configured to function as an aspheric lens when the alternating current supplied to each of the layers differs in magnitude and a refractive index distribution in the optical property altering element becomes non- uniform.

6. The optical property altering apparatus according to claim 1, wherein refractive index distribution in the optical property altering element is set to be suitable for zoom or focus mechanisms.

7. The optical property altering apparatus according to claim 1, wherein the optical property altering element is arranged on a surface of an imaging lens.

8. The optical property altering apparatus according to claim 1, wherein a supply of the amplified alternating current from the amplifying circuit arbitrarily alters a refractive index of the optical property altering element during use of the optical property altering apparatus.

9. An optical property altering apparatus comprising:
    an optical property altering element formed by a plurality of inductors that are smaller than a wavelength of visible light, mutually connected by connecting lines, and arranged in a single plane; and
    a power source that generates and supplies alternating current to the optical property altering element,
    wherein the optical property altering element is configured to function as an aspheric lens when the alternating current is supplied to only a portion of the plurality of inductors.

10. The optical property altering apparatus according to claim 9, wherein:
    the optical property altering element is formed as a plurality of grids, and
    the optical property altering element is configured to function as an aspheric lens when the alternating current supplied to each of the grids differs in magnitude and a refractive distribution in the optical property altering element becomes non-uniform.

11. The optical property altering apparatus according to claim 10, wherein
    the grids are formed in a plurality of independent layers,
    the optical property altering element is configured to function as an aspheric lens when the alternating current supplied to each of the layers differs in magnitude and a refractive distribution in the optical property altering element becomes non-uniform.

12. The optical property altering apparatus according to claim 9, further comprising:
    a frequency/phase detecting unit that is configured to detect a frequency and a phase of incident light, wherein the power source is configured to supply alternating current having the frequency and the phase detected by the frequency/phase detecting unit to the optical property altering element.

13. The optical property altering apparatus according to claim 12, further comprising:
   a distortion detecting unit that is configured to detect imaging distortion,
   wherein the frequency/phase detecting unit detects the frequency and phase of light that causes imaging distortion detected by the distortion detecting unit.

14. The optical property altering apparatus according to claim 9, wherein the optical property altering element is arranged on a surface of an optical element of a telescope.

15. The optical property altering apparatus according to claim 14, wherein the power source is configured to supply alternating current to portions of the plurality of inductors such that a predicted image distortion caused by an optical element of the telescope is corrected.

16. The optical property altering apparatus according to claim 14, wherein the optical element is smallest among optical elements of the telescope.

17. The optical property altering apparatus according to claim 16, wherein the power source is configured to supply alternating current to portions of the plurality of inductors such that a predicted image distortion caused by an optical element of the telescope is corrected.

* * * * *